United States Patent
Saleh et al.

(10) Patent No.: US 11,321,632 B2
(45) Date of Patent: May 3, 2022

(54) MACHINE LEARNING BASED ON POST-TRANSACTION DATA

(71) Applicant: PayPal, Inc., San Jose, CA (US)

(72) Inventors: Moein Saleh, Campbell, CA (US); Xing Ji, San Jose, CA (US); Shubhranshu Shekhar, Pittsburgh, PA (US)

(73) Assignee: PayPal, Inc., San Jose, CA (US)

(*) Notice: Subject to any disclaimer, the term of this patent is extended or adjusted under 35 U.S.C. 154(b) by 728 days.

(21) Appl. No.: 16/198,445

(22) Filed: Nov. 21, 2018

(65) Prior Publication Data
US 2020/0160232 A1    May 21, 2020

(51) Int. Cl.
*G06N 20/00* (2019.01)
*G06Q 30/06* (2012.01)
*G06N 5/04* (2006.01)

(52) U.S. Cl.
CPC .............. *G06N 20/00* (2019.01); *G06N 5/04* (2013.01); *G06Q 30/06* (2013.01)

(58) Field of Classification Search
USPC ........................................... 705/14, 319, 12
See application file for complete search history.

(56) References Cited

U.S. PATENT DOCUMENTS

| | | | |
|---|---|---|---|
| 6,330,546 B1* | 12/2001 | Gopinathan | G06Q 20/00 705/35 |
| 7,587,348 B2 | 9/2009 | Liao et al. | |
| 7,668,769 B2 | 2/2010 | Baker et al. | |
| 2012/0109821 A1* | 5/2012 | Barbour | G06Q 40/02 705/44 |
| 2013/0097698 A1 | 4/2013 | Taveau et al. | |
| 2016/0335432 A1 | 11/2016 | Vatamanu et al. | |
| 2017/0200164 A1* | 7/2017 | Choi | G06N 20/00 |
| 2018/0005285 A1* | 1/2018 | Narasimhan | G06Q 30/0605 |

(Continued)

OTHER PUBLICATIONS

Transaction Processing Past Present and Future (Year: 2012).*

(Continued)

*Primary Examiner* — Gautam Ubale
(74) *Attorney, Agent, or Firm* — Kowert, Hood, Munyon, Rankin & Goetzel, P.C.

(57) ABSTRACT

Techniques are disclosed relating to classifying transactions using post-transaction information. Training architecture may be used to train a first classifier module using first data for a set of transactions as training data input, where the first data includes both pre-transaction information and post-transaction information for transactions in the set of transactions. During training of the first classifier module, in disclosed techniques, correct classifications for the transaction in the set of transactions are known. The training architecture, in disclosed techniques, generates respective weights for multiple transactions in the set of transactions based on classification outputs of the trained first classifier for the multiple transactions. In disclosed techniques, the training architecture trains a second classifier module, based on the generated weights, using second data for the set of transactions as training data input. In some embodiments, the trained second classifier module classifies one or more pending transactions based only on pre-transaction information for the one or more pending transactions.

20 Claims, 7 Drawing Sheets

(56) References Cited

U.S. PATENT DOCUMENTS

| | | | |
|---|---|---|---|
| 2018/0046939 A1* | 2/2018 | Meron | G06Q 20/405 |
| 2018/0053105 A1* | 2/2018 | Paul | G06N 3/0454 |
| 2018/0107944 A1* | 4/2018 | Lin | G06Q 20/4016 |
| 2018/0158552 A1 | 6/2018 | Liu et al. | |
| 2018/0268506 A1* | 9/2018 | Wodetzki | G06K 9/628 |
| 2018/0276541 A1* | 9/2018 | Studnitzer | G06N 3/0454 |
| 2018/0350006 A1* | 12/2018 | Agrawal | G06F 7/026 |
| 2018/0357643 A1* | 12/2018 | Lee | G06Q 20/4016 |
| 2019/0102675 A1* | 4/2019 | Biswas | G06N 3/0445 |
| 2019/0147509 A1* | 5/2019 | Mehta | G06Q 30/06 705/7.39 |
| 2019/0164159 A1* | 5/2019 | Ponniah | G06K 9/6278 |
| 2020/0005270 A1* | 1/2020 | Griffith | G06Q 20/227 |
| 2020/0082004 A1* | 3/2020 | Dubost | G06F 16/219 |
| 2020/0098053 A1* | 3/2020 | Lesner | G06N 3/08 |
| 2020/0286095 A1* | 9/2020 | Anunciacao | G06K 9/6223 |
| 2021/0150530 A1* | 5/2021 | Lin | G06Q 20/4016 |
| 2021/0248611 A1* | 8/2021 | Matyska | G06N 3/08 |

OTHER PUBLICATIONS

Pay2you_places_The_mobile_payment_with_geo-location (Year: 2014).*

A_Survey_of_Enabling_Technologies_for_Network_Localization_Tracking_and_Navigation (Year: 2018).*

International Application No. PCT/US2019/062355, International Preliminary Report on Patentability dated Jun. 3, 2021, 10 pages.

International Search Report and Written Opinion in Appl. No. PCT/US2019/062355 dated Jan. 29, 2020, 16 pages.

* cited by examiner

| User ID 212 | Transaction amount 214 | Date 216 | Fraudulent transaction? 218 |
|---|---|---|---|
| 1234 | $400 | 06/06/2018 | No |
| 1234 | $40 | 06/06/2018 | No |
| 1234 | $300 | 06/07/2018 | Yes |
| 1234 | $450 | 06/08/2018 | No |

Pre-transaction information (historical data) { (first three data rows)

Post-transaction information {

Geofence information 220

Internet activity information 224

*Fig. 2*

MACHINE LEARNING BASED ON POST-TRANSACTION DATA

BACKGROUND

Technical Field

This disclosure relates generally to machine learning classifiers and, more specifically, to training classifiers using instance weights based on post-transaction data.

Description of the Related Art

Transactions may be classified for various reasons, including identifying certain types of transactions for further scrutiny (e.g., detecting anomalous transactions for computer security purposes). Machine learning may be used to train various types of classifiers to identify transaction types. Traditionally, classifiers are trained based only on information available prior to transaction completion (e.g., because this is the only information available when classifying a transaction in real time). Generally, improving the accuracy of classifiers may reduce or avoid security issues.

BRIEF DESCRIPTION OF THE DRAWINGS

FIG. 2 illustrates example pre- and post-transaction information relative to a training transaction, according to some embodiments.

Figure 1A:
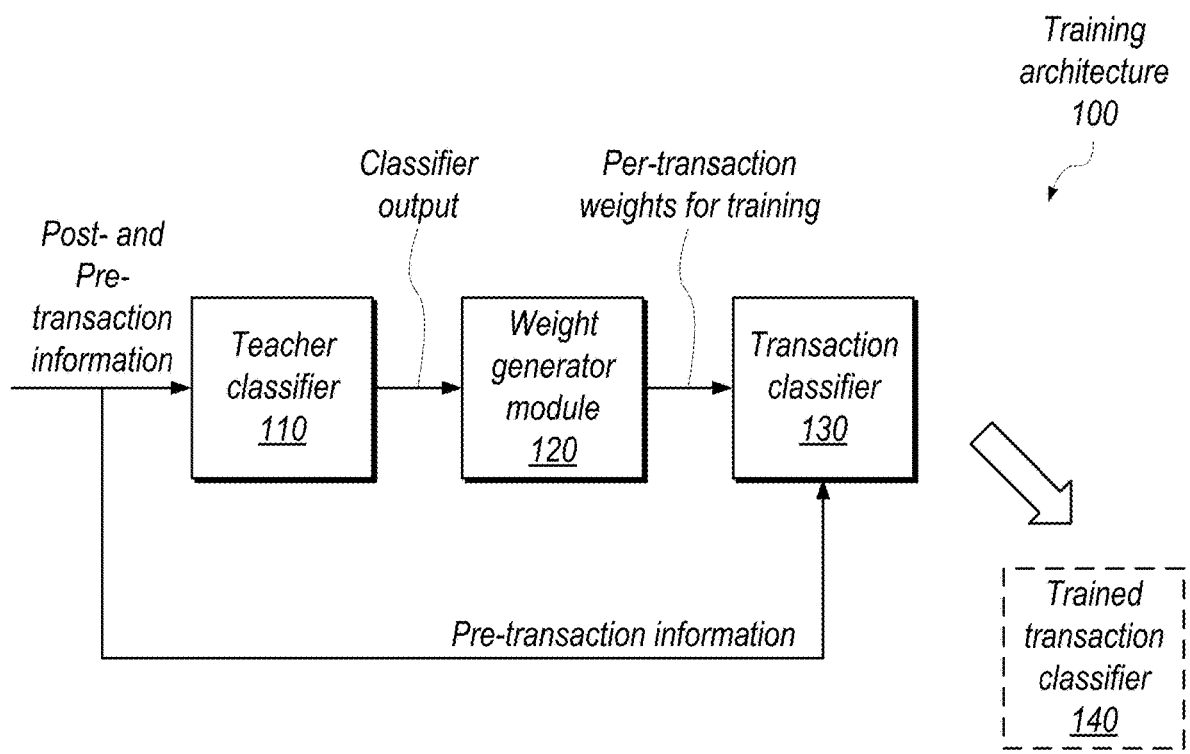
FIG. 1A is a block diagram illustrating an example training architecture that uses post-transaction information to generate weights for training data, according to some embodiments.

This specification includes references to various embodiments, to indicate that the present disclosure is not intended to refer to one particular implementation, but rather a range of embodiments that fall within the spirit of the present disclosure, including the appended claims. Particular features, structures, or characteristics may be combined in any suitable manner consistent with this disclosure.

Within this disclosure, different entities (which may variously be referred to as "units," "circuits," other components, etc.) may be described or claimed as "configured" to perform one or more tasks or operations. This formulation—[entity] configured to [perform one or more tasks]—is used herein to refer to structure (i.e., something physical, such as an electronic circuit). More specifically, this formulation is used to indicate that this structure is arranged to perform the one or more tasks during operation. A structure can be said to be "configured to" perform some task even if the structure is not currently being operated. A "trained transaction classifier configured to classify one or more transactions" is intended to cover, for example, a device that performs this function during operation, even if the corresponding device is not currently being used (e.g., when its battery is not connected to it). Thus, an entity described or recited as "configured to" perform some task refers to something physical, such as a device, circuit, memory storing program instructions executable to implement the task, etc. This phrase is not used herein to refer to something intangible.

The term "configured to" is not intended to mean "configurable to." An unprogrammed mobile computing device, for example, would not be considered to be "configured to" perform some specific function, although it may be "configurable to" perform that function. After appropriate programming, the mobile computing device may then be configured to perform that function.

Reciting in the appended claims that a structure is "configured to" perform one or more tasks is expressly intended not to invoke 35 U.S.C. § 112(f) for that claim element. Accordingly, none of the claims in this application as filed are intended to be interpreted as having means-plus-function elements. Should Applicant wish to invoke Section 112(f) during prosecution, it will recite claim elements using the "means for" [performing a function] construct.

As used herein, the term "based on" is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor and is used to determine A or affects the determination of A. This phrase does not foreclose that the determination of A may also be based on some other factor, such as C. This phrase is also intended to cover an embodiment in which A is determined based solely on B. As used herein, the phrase "based on" is synonymous with the phrase "based at least in part on."

As used herein, the term "processing element" refers to various elements configured to execute program instructions (or portions thereof or combinations thereof). Processing elements include, for example, circuits such as an ASIC (Application Specific Integrated Circuit), portions or circuits of individual processor cores, entire processor cores, individual processors, programmable hardware devices such as a field programmable gate array (FPGA), and/or larger portions of systems that include multiple processors, as well as any combinations thereof.

DETAILED DESCRIPTION

Techniques are disclosed for training a transaction classifier, using machine learning techniques, with weights generated based on post-transaction data. When classifying transactions in real-time (e.g., to determine whether to approve a transaction), post-transaction information is unavailable at the time of classifying. Therefore, traditionally, post-transaction information has not been used to train classifiers.

In disclosed embodiments, however, a teacher classifier is trained based on post-transaction data and used to generate instance weights (e.g., a weight for each transaction used as a training input). The instance weights may then be used in training a real-time classifier. For example, highly weighted transactions may have more impact on training the real-time classifier. In various embodiments, using post-transaction information in classifier training may improve the accuracy of a transaction classifier and in turn may improve the catch rate for certain types of transactions (e.g., undesirable transactions).

Overview of Training Architecture and Real-Time Classification

FIG. 1A is a block diagram illustrating an example training architecture that uses post-transaction information to generate weights for training data, according to some embodiments. In the illustrated embodiment training architecture 100 includes teacher classifier 110, weight generator module 120, and transaction classifier 130. In the illustrated embodiment, the training architecture 100 produces a trained transaction classifier 140, discussed below with reference to FIG. 1B. In various embodiments, one or more of the elements of FIG. 1A may have access to known correct classifications for training transactions.

In FIG. 1A, teacher classifier 110 receives both pre- and post-transaction information as inputs. In the illustrated embodiment, the teacher classifier 110 generates classifier outputs. In some embodiments, classifier output indicates a predicted likelihood that a transaction is in a certain class. For classifiers with two class outputs, for example, a probability may be indicated using a value between 0 and 1, where a value of 0 indicates a very strong likelihood of a first class of transaction (e.g., a normal transaction) and a value of 1 indicates a very strong likelihood of a second class of transaction (e.g., a fraudulent transaction). Values in between may indicate predictions with less confidence. For example, a value of 0.4 may indicate a transaction that is likely normal, but with a fairly low confidence. The example scale of 0 to 1 for classifier outputs is included for purposes of illustration but is not intended to limit the scope of the present disclosure; other output ranges and other numbers of classes are contemplated. Example sets of classifier outputs are discussed below with reference to FIGS. 4A and 5A.

Weight generator module 120, in the illustrated embodiment, generates weights for transactions based on classifier outputs from teacher classifier 110. Weight generator module 120, in the illustrated embodiment, sends generated per-transaction weights for training to the transaction classifier 130. In some embodiments, various different weighting techniques are used to generate weights based on the output of the teacher classifier 110. In some embodiments with output ranges from 0 to 1, the predictions of classifier 110 are input to the following weighting equation to determine the weight for a transaction:

$$\text{weight} = \frac{\text{known classification}}{\text{teacher classifier output}} + \frac{1 - \text{known classification}}{1 - \text{teacher classifier output}}$$

This approach may provide greater weight to transactions that are further from the known correct classification (e.g., for a classifier output range of 0 to 1 and a known correct classification of 1, an output of 0.4 is further from the known classification than an output of 0.2). This may improve classifier accuracy in situations where training harder on difficult classifications provides better overall classification results (which may not be the case all situations). In other embodiments, any of various other techniques may be used to generate weights. For example, in some embodiments, the reciprocal of the weight in the equation above may be used (e.g., to give greater weight for transactions that are closer to the correct known classification).

In some embodiments, the system generates multiple different sets of weights using multiple different weighting techniques. In some embodiments, these multiple different sets of weights are used to train the transaction classifier 130, generating different versions of trained transaction classifier 140. In some embodiments, a preferred (e.g., most accurate) version of the different classifiers is determined based on the known correct classifications for the transactions classified by the different versions of trained transaction classifier 140. In some embodiments, the determined version of classifier 140 is selected for classification of future transactions.

Transaction classifier 130, in the illustrated embodiment, receives per-transaction weights and pre-transaction information for corresponding transactions. In the illustrated embodiment, transaction classifier 130 is not trained on post-transaction information (other than based on the weights). In the illustrated embodiment, transaction classifier 130 is trained based on the per-transaction weights to generate trained transaction classifier 140. In some embodiments, transaction classifier 130 is trained using machine learning techniques similar to those used to train teacher classifier 110. For example, teacher classifier 110 and transaction classifier 130 may be the same type and topology of classifier. In some embodiments, the classifier output generated by transaction classifier 130 is compared to the correct known classifications for the input training transactions to generate a metric for the training of classifier 130 (e.g., how well classifier 130 is being trained).

As discussed above, various modules discussed herein may implement machine learning techniques, including one or more of the following: gradient boosting, logistic regression, naïve Bayes, decision trees, random forests, neural networks, etc. In various embodiments, the per-transaction weights may be used to indicate emphasis on certain transactions during training, e.g., by performing more iterations on those transactions, making more drastic training adjustments (e.g., updating an internal neural network weight) based on errors for those transactions, etc.

Consider, for example, first and second transactions in a set of transactions used as training instances in the training architecture discussed above with reference to FIG. 1. In this example, the known correct classifications for the first and second transactions are both 0. In this example, the first and second transactions within the set may be input to the teacher classifier 110. The teacher classifier 110, in this example, generates classifier output values of 0.2 for the first transaction and 0.5 for the second transaction and sends them to the weight generator module 120. Further, in this example, module 120 generates and assigns a lower weight (e.g., of 1) to the first transaction and a greater weight (e.g., of 5) to the second transaction based on the classifier output values. Finally, the transaction classifier 130 is trained based on the assigned weights for the two transactions, where the second transaction has a greater impact on the training of transaction classifier 130, in this example.

Figure 1B:
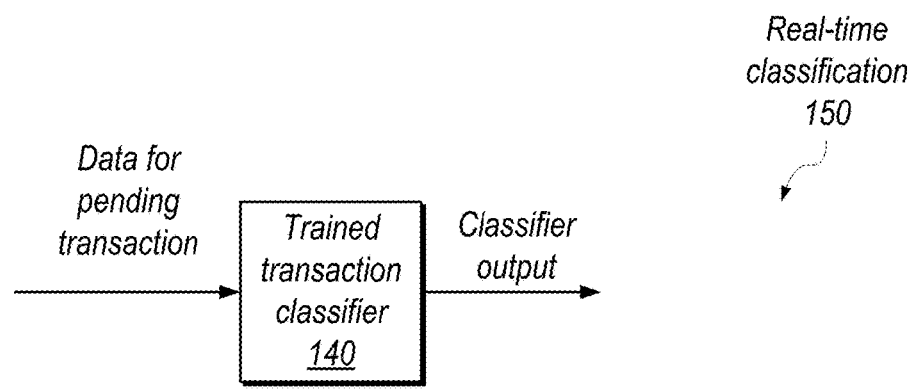
FIG. 1B is a block diagram illustrating an example classifier that is trained according to the architecture of FIG. 1A, according to some embodiments.

FIG. 1B is a block diagram illustrating an example classifier that is trained according to the architecture of FIG.

1A, according to some embodiments. In the illustrated embodiment, trained transaction classifier 140 performs real-time classification 150 of a transaction. In the illustrated embodiment, data for a pending transaction is input to classifier 140. In the illustrated embodiment, classifier 140 generates a classifier output for the pending transaction. In some embodiments, transactions are input to trained transaction classifier 140 for classification in real-time. In some embodiments, based on the classifier output, a transaction authorization system terminates or authorizes one or more transactions input to classifier 140.

As used herein, the term "module" refers to circuitry configured to perform specified operations or to physical non-transitory computer readable media that store information (e.g., program instructions) that instructs other circuitry (e.g., a processor) to perform specified operations. Modules may be implemented in multiple ways, including as a hardwired circuit or as a memory having program instructions stored therein that are executable by one or more processors to perform the operations. A hardware circuit may include, for example, custom very-large-scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices, or the like. A module may also be any suitable form of non-transitory computer readable media storing program instructions executable to perform specified operations.

Example Pre- and Post-Transaction Information

As used herein, the term "pre-transaction information" refers to information available to a classifier prior to the relevant pending transaction being complete. Thus, pre-transaction information may include information received after the transaction has been initiated but before the transaction is complete. Pre-transaction information may include, for example, data from transactions that are pending or complete before completion of the current pending transaction and other non-transaction information such as user activity, user location, etc. Various pre and post-transaction information may be used (with or without pre-processing) to generate features that are input to classifiers 110 and/or 140.

As used herein, the term "post-transaction information" refers to information that is not available until after the relevant transaction is complete. In some embodiments, post-transaction information includes a transaction that is initiated after the current pending transaction is complete. Additionally, post-transaction information may include non-transaction information such as other user activity. Thus, post-transaction information may include one or more of the following attributes: user activity on one or more devices, geofence information, clicking activity, dollar amount of one or more transactions, number of items in one or more transactions, types of items, user information, type of device on which one or more transactions are initiated, number of transactions following the completed transaction, total dollar amount of various transactions following the completed transaction, etc.

FIG. 2 illustrates example pre- and post-transaction information relative to a training transaction, according to some embodiments. In the illustrated example, the first three rows are pre-transaction information relative to a particular training transaction (not explicitly shown) while the remaining rows represent post-transaction information. In the illustrated example, the post-transaction information includes a $450 transaction, geofence information 220, and internet activity information 224 (although any of various types of transaction and non-transaction information may be utilized in various embodiments).

In the illustrated embodiment, the user ID column contains a single identification number (all four transactions are for the same user in this example). In the illustrated embodiment, the transaction amount 214 is shown for each transaction as dollar amounts $400, $40, $300, and $450. In the illustrated embodiment, the date 216 is shown for when each transaction is initiated. In the illustrated embodiment, the rightmost column shows whether or not a transaction is a fraudulent transaction 218. In the illustrated embodiment, the third transaction from the top has been classified as a fraudulent transaction, while the other transactions have not.

In the illustrated embodiment, the last transaction (amount $450) is considered post-transaction information relative to the particular training transaction discussed above (it is not available during real-time classification of the particular transaction). In some embodiments, post-transaction information includes multiple transactions. In some embodiments, geofencing information 220 includes one or more of the following: the time of day a device associated with the user enters a geofence, which part of the geofence the user enters, time of day the user exits the geofence, etc. In some embodiments, internet activity information 224 includes one or more of the following: user browsing information, number of websites viewed, length of view, internet search field input, networks used to connect, etc. Various different types of information other than or in addition to information 220 and 224 may be considered post-transaction information. Note that any of various data structures may be used to store pre- and post-transaction information; the disclosed examples are not intended to limit the scope of the present disclosure.

Figure 3:
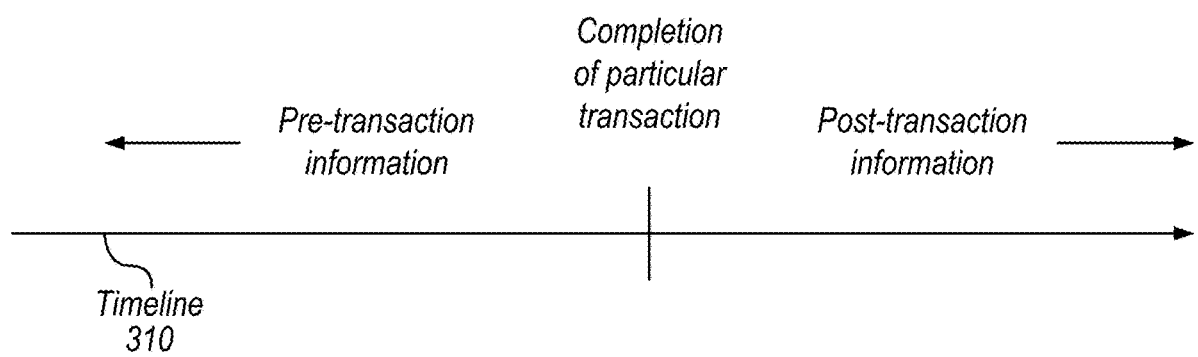
FIG. 3 illustrates an example timeline indicating pre- and post-transaction information relative to a pending transaction, according to some embodiments.

FIG. 3 shows a timeline 310 with a particular example transaction at the center of the timeline. In the illustrated embodiment, pre-transaction information is indicated to the left of the completion of the particular transaction on the timeline and is available during real-time classification of the particular transaction. Post-transaction information is indicated to the right of the completion of the particular transaction on the timeline and is available after completion of the particular transaction.

Example Teacher Classifier Output and Assigned Weights

Figure 4A:
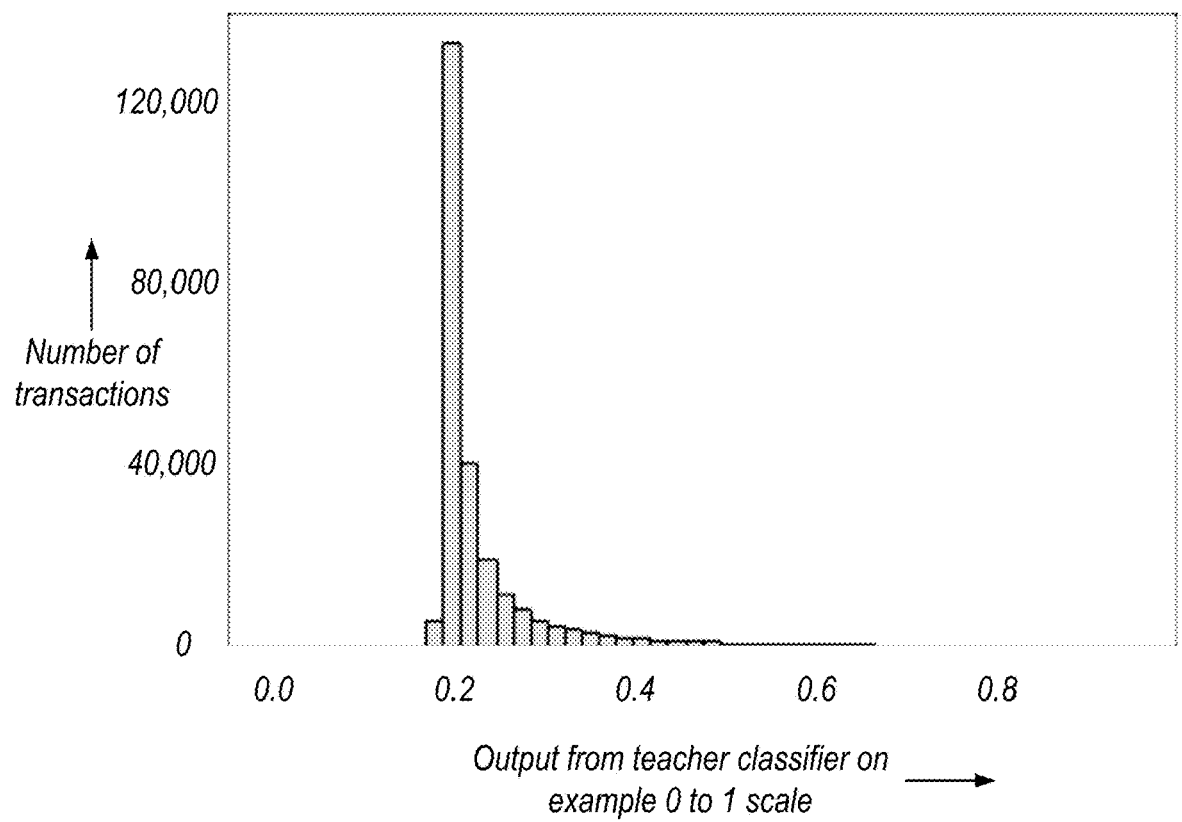
FIG. 4A is a plot illustrating example numbers of transactions for different output values from a teacher classifier, according to some embodiments.
Figure 4B:
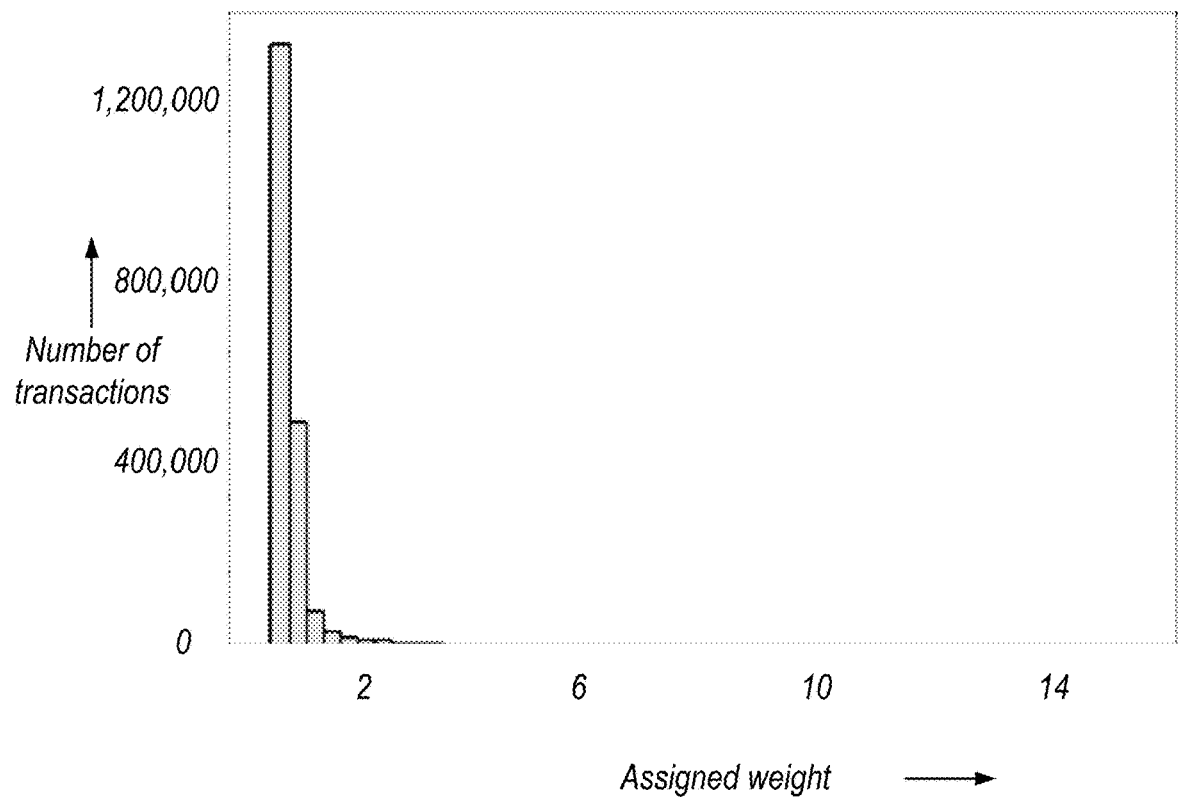
FIG. 4B is a plot illustrating example numbers of transactions having different assigned weights based on output values from the teacher classifier, according to some embodiments.
Figure 5A:
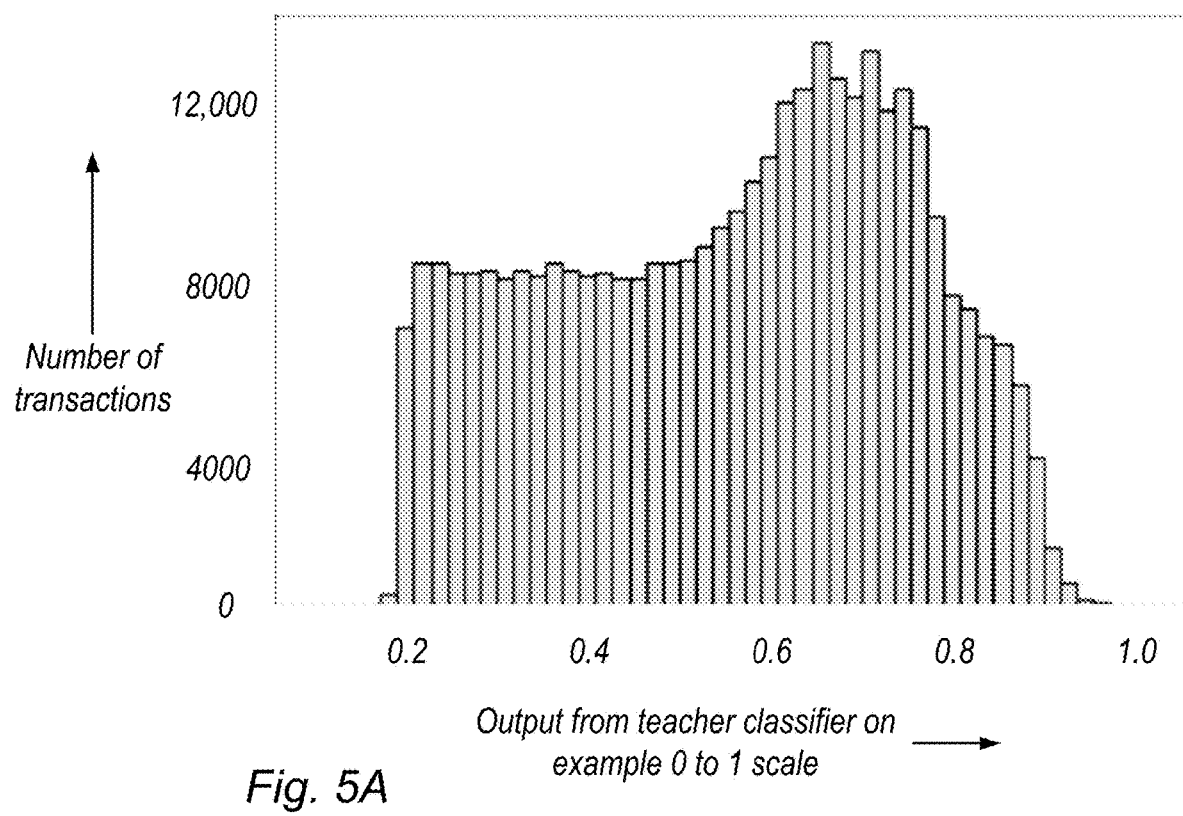
FIG. 5A is a plot illustrating example numbers of transactions for different output values from a teacher classifier having a greater number of low-confidence output values relative to the plot of FIG. 4A, according to some embodiments.
Figure 5B:
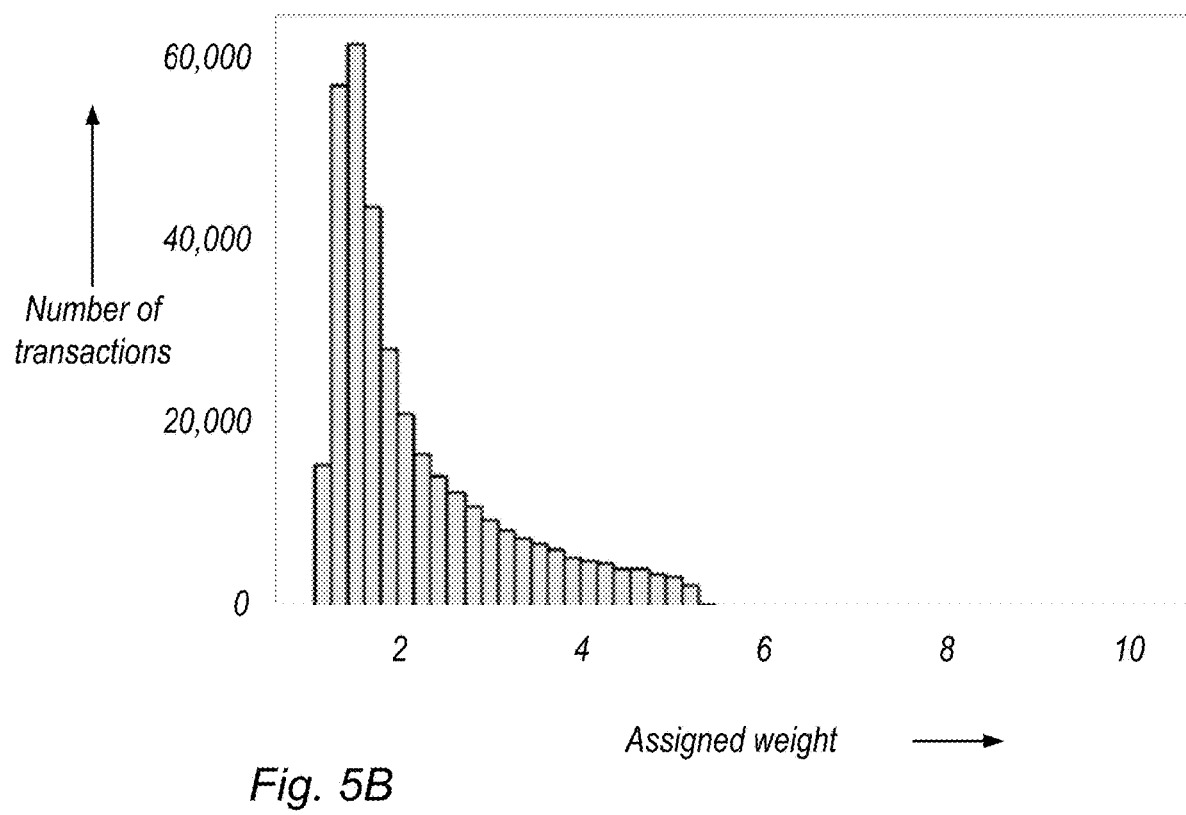
FIG. 5B is a plot illustrating example numbers of transactions having different weights based on the output values of FIG. 5A, according to some embodiments.

FIGS. 4A-5B are plots illustrating example outputs from teacher classifier 110 and corresponding assigned weights, according to some embodiments. FIGS. 4A-4B represent a set of training transactions with a known correct classification of 0 and FIGS. 5A-5B represent a set of training transactions with a known correct classification of 1. The illustrated examples use greater weights for transactions with predicted outputs that are further from the correct result, but other weighting techniques may not exhibit this characteristic.

FIG. 4A is a plot illustrating example numbers of transactions for different output values from a teacher classifier, according to some embodiments. In the illustrated embodiment, for numerous transactions, output values predicting whether a transaction should be classified as a first class or a second class are shown (e.g., whether a transaction should be classified as good or bad), where the output values are on an example scale between 0 and 1. The output prediction values of the teacher classifier, in the illustrated embodiment, are generated based on both pre-transaction and post-transaction information. Note that using a teacher classifier that is trained based on post-transaction information may improve the accuracy of the transaction classifier, relative to implementations in which the transaction classifier is trained without any training input parameters that are based on post-transaction information (e.g., without a teacher classifier).

The transactions plotted for the example of FIG. 4A all have a known correct classification of 0. In the illustrated embodiment, most output predictions are in the 0.1 to 0.3 range. Note that a small number of predictions, however, are far from the correct classification (e.g., in the 0.5 to 0.6 range).

As discussed above with reference to FIG. 1A, in some embodiments, weights are assigned to transactions based on the output predictions of the teacher classifier for those transactions (based on the confidence level of the teacher classifier). For example, a transaction may be weighted based on whether it was correctly classified and/or based on the confidence of the classifier (e.g., a prediction of 0.4 for a known good transaction may have a lower confidence than a prediction of 0.2). In the illustrated examples of FIGS. 4A-5B, predictions that are less confident or incorrect are given greater weight, but in other embodiments any of various weighting techniques may be used.

FIG. 4B is a plot illustrating example numbers of transactions having different assigned weights based on output values from the teacher classifier, according to some embodiments. In the illustrated embodiment, weights have been assigned to numerous transactions based on the outputs displayed in FIG. 4A and known correct classification values for the numerous transactions. In FIG. 4B, a large majority of the output predictions have been assigned small weight values (e.g., between 1 and 2).

FIG. 5A is a plot illustrating example numbers of transactions for different output values from a teacher classifier having a greater number of low-confidence output values relative to the plot of FIG. 4A, according to some embodiments. The transactions plotted for the example of FIG. 4A all have a known correct classification of 0. FIG. 5A illustrates numerous transactions with classifications in the 0.4 to 0.6 range, indicating that the teacher classifier is not confident in the classification of these transactions. Further, FIG. 5A illustrates numerous transactions in the 0.2 to 0.4 range, which may indicate those transactions were classified incorrectly.

FIG. 5B is a plot illustrating example numbers of transactions having different weights based on the output values of FIG. 5A, according to some embodiments. In the illustrated embodiment, a greater number of transactions are weighted with values greater than 2 in comparison with the number of transactions weighted with values greater than 2 in FIG. 4B. This example scenario corresponds to an embodiment in which incorrectly-predicted and/or lower-confidence predicted transactions receive greater weights.

In some embodiments, certain training transactions may be ignored and/or assigned weights that result in those transactions having no impact on training classifier 140. In some embodiments, the system may also assign weights to training transactions based on one or more particular attributes of the training transactions in addition to or in place of assigning weights based on outputs of the teacher classifier. For example, in some embodiments, one or more classifiers are trained based on a dollar value attribute. For example, a transaction with a large dollar value (e.g., $10,00) may be weighted higher than a transaction with a small dollar value (e.g., $10). In various embodiments, transaction attributes include one or more of the following: dollar amount, quantity of items, location, service provider, transaction type, etc.

Example Method

Figure 6:
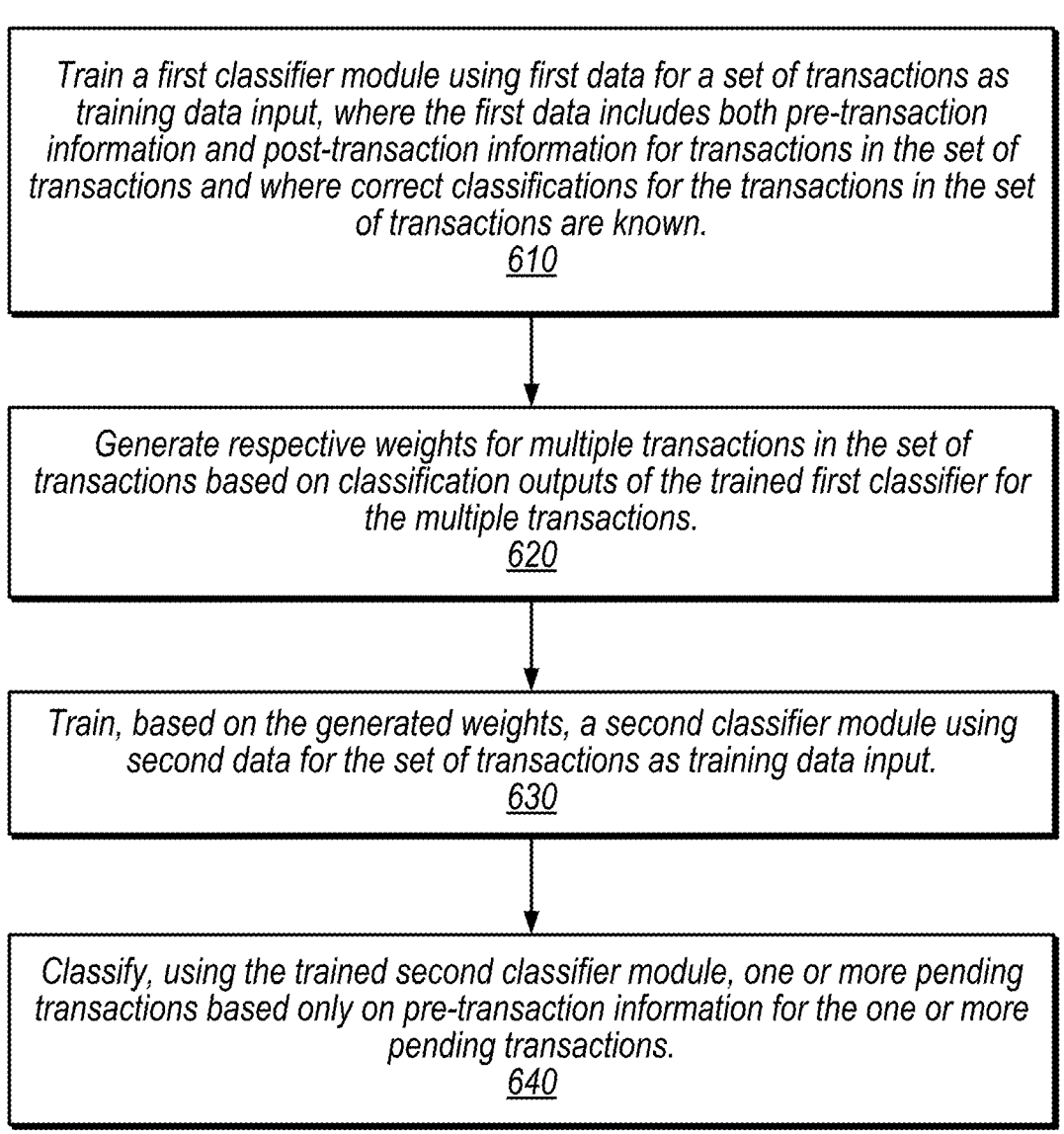
FIG. 6 is a block diagram illustrating an exemplary method for training a classification module using one or more generated weights, according to some embodiments.

FIG. 6 is a diagram illustrating an exemplary method for training a classification module using one or more generated weights, according to some embodiments. The method shown in FIG. 6 may be used in conjunction with any of the computer circuitry, systems, devices, elements, or components disclosed herein, among other devices. In various embodiments, some of the method elements shown may be performed concurrently, in a different order than shown, or may be omitted. Additional method elements may also be performed as desired.

At 610, in the illustrated embodiment, a computing device trains a first classifier module using first data for a set of transactions as training data input, where the first data includes both pre-transaction information and post-transaction information for transactions in the set of transactions and where correct classifications for the transactions in the set of transactions are known. In some embodiments, the post-transaction information for a first transaction in the set of transactions includes information for one or more transactions performed subsequent to the first transaction and non-transaction activity for a user associated with the first transaction.

At 620, in the illustrated embodiment, the computing device generates respective weights for multiple transactions in the set of transactions based on classification outputs of the trained first classifier for the multiple transactions. In some embodiments, the computing device generates respective weights based on relationships between correct classifications and output predictions generated by the trained first classifier module for the transactions. For example, if an output prediction is far from the correct known classification for a given transaction, the weight assigned to the given transaction may be greater than a weight assigned to a transaction with an output prediction close to the correct known classification. In some embodiments, the computing device generates greater weights for transactions whose output predictions are further from the correct classification. In some embodiments, the weighting indicates not to use one or more transactions in the set of transactions for training the second classifier module.

At 630, in the illustrated embodiment, the computing device trains, based on the generated weights, a second classifier module using second data for the set of transactions as training data input. In some embodiments, the second data for the set of transactions includes pre-transaction information for transactions in the set of transactions and does not include post-transaction information for transactions in the set of transactions. In some embodiments, the computing device generates respective weights using multiple different weighting techniques to generate multiple sets of weights. In some embodiments, the computing device trains the second classifier module on multiple versions of the second classifier module using the multiple sets of weights. In some embodiments, the computing device selects a trained version of the multiple versions of the second classifier module. In some embodiments, the computing device trains the second classifier module based on the generated weights using gradient boosting tree machine learning techniques.

At 640, in the illustrated embodiment, the computing device classifies, using the trained second classifier module, one or more pending transactions based only on pre-transaction information for the one or more pending transactions.

In some embodiments, using post-transaction information in training a transaction classifier may advantageously improve the catch rate of the transaction classifier. In some embodiments, a small improvement in catch rate for fraudulent transactions may substantially improve overall transaction security.

Note that various embodiments discussed herein may relate to payment transactions (e.g., when discussing fraud). In other embodiments, the disclosed techniques may be used for any of various types of transactions and classifications. For example, the disclosed techniques may be used to predict medical outcomes where transactions correspond to procedures such as surgery. In this example embodiment, pre-transaction information includes information available before and during the medical procedure while post-transaction information may include one or more of the following: medication administered after the surgery is complete, symptoms of the patient within the two weeks following the completion of the surgery, symptoms of other patients who receive the same type of surgery after the current surgery is complete, etc.

Example Computing Device

Figure 7:
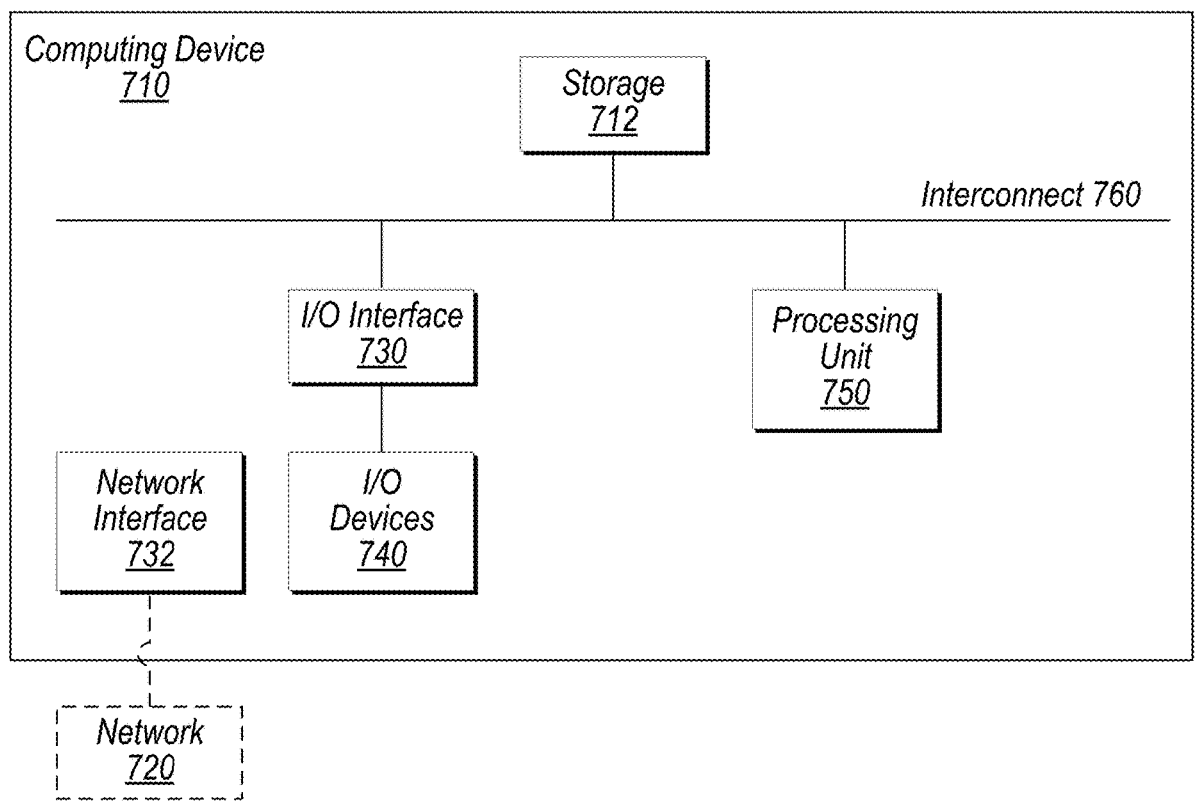
FIG. 7 is a block diagram illustrating an exemplary computing device, according to some embodiments.

Turning now to FIG. 7, a block diagram of one embodiment of computing device (which may also be referred to as a computing system) 710 is depicted. Computing device 710 may be used to implement various portions of this disclosure. Computing device 710 may be any suitable type of device, including, but not limited to, a personal computer system, desktop computer, laptop or notebook computer, mainframe computer system, web server, workstation, or network computer. As shown, computing device 710 includes processing unit 750, storage 712, and input/output (I/O) interface 730 coupled via an interconnect 760 (e.g., a system bus). I/O interface 730 may be coupled to one or more I/O devices 740. Computing device 710 further includes network interface 732, which may be coupled to network 720 for communications with, for example, other computing devices.

In various embodiments, processing unit 750 includes one or more processors. In some embodiments, processing unit 750 includes one or more coprocessor units. In some embodiments, multiple instances of processing unit 750 may be coupled to interconnect 760. Processing unit 750 (or each processor within 750) may contain a cache or other form of on-board memory. In some embodiments, processing unit 750 may be implemented as a general-purpose processing unit, and in other embodiments it may be implemented as a special purpose processing unit (e.g., an ASIC). In general, computing device 710 is not limited to any particular type of processing unit or processor subsystem.

Storage subsystem 712 is usable by processing unit 750 (e.g., to store instructions executable by and data used by processing unit 750). Storage subsystem 712 may be implemented by any suitable type of physical memory media, including hard disk storage, floppy disk storage, removable disk storage, flash memory, random access memory (RAM—SRAM, EDO RAM, SDRAM, DDR SDRAM, RDRAM, etc.), ROM (PROM, EEPROM, etc.), and so on. Storage subsystem 712 may consist solely of volatile memory, in one embodiment. Storage subsystem 712 may store program instructions executable by computing device 710 using processing unit 750, including program instructions executable to cause computing device 710 to implement the various techniques disclosed herein.

I/O interface 730 may represent one or more interfaces and may be any of various types of interfaces configured to couple to and communicate with other devices, according to various embodiments. In one embodiment, I/O interface 730 is a bridge chip from a front-side to one or more back-side buses. I/O interface 730 may be coupled to one or more I/O devices 740 via one or more corresponding buses or other interfaces. Examples of I/O devices include storage devices (hard disk, optical drive, removable flash drive, storage array, SAN, or an associated controller), network interface devices, user interface devices or other devices (e.g., graphics, sound, etc.).

Various articles of manufacture that store instructions (and, optionally, data) executable by a computing system to implement techniques disclosed herein are also contemplated. The computing system may execute the instructions using one or more processing elements. The articles of manufacture include non-transitory computer-readable memory media. The contemplated non-transitory computer-readable memory media include portions of a memory subsystem of a computing device as well as storage media or memory media such as magnetic media (e.g., disk) or optical media (e.g., CD, DVD, and related technologies, etc.). The non-transitory computer-readable media may be either volatile or nonvolatile memory.

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of this disclosure.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

What is claimed is:

1. A method comprising:
    training a first classifier module using first data for a set of completed transactions as training data input, wherein the first data includes, for respective transactions in the set of completed transactions both a set of pre-transaction information and a set of post-transaction information wherein correct classifications for transactions in the set of completed transactions are known, and wherein the set of post-transaction information for a first transaction in the set of completed transactions includes information for one or more transactions performed subsequent to the first transaction and non-transaction activity occurring subsequent to the first transaction for a user associated with the first transaction;

generating respective weights for multiple transactions in the set of completed transactions based on classification outputs of the trained first classifier module for the multiple transactions;

training, based on the generated weights, a second classifier module using second data for the set of completed transactions as training data input, wherein the second data for the set of completed transactions includes pre-transaction information for transactions in the set of completed transactions;

classifying, using the trained second classifier module, one or more pending transactions based only on respective sets of pre-transaction information for the one or more pending transactions; and generating, based on classifications output by the trained second classifier module for the one or more pending transactions, an authorization decision for the one or more pending transactions.

2. The method of claim 1, wherein the training based on the generated weights includes one or more of:

performing a greater number of training iterations for a first transaction than for a second transaction based on the first transaction having a greater weight than the second transaction; or performing a greater training adjustment for a first transaction than for a second transaction based on the first transaction having a greater weight than the second transaction.

3. The method of claim 1, wherein the generating respective weights is performed using multiple different weighting techniques to generate multiple sets of weights;

wherein the training the second classifier module is performed on multiple versions of the second classifier module using the multiple sets of weights;

wherein the method further comprises: selecting a trained version of the multiple versions of the second classifier module.

4. The method of claim 1, wherein the generating the respective weights is based on relationships between correct classifications and output predictions generated by the trained first classifier module for the transactions.

5. The method of claim 1, wherein the generating the respective weights provides greater weights for transactions whose output predictions are further from correct classifications.

6. The method of claim 1, wherein the training the second classifier module based on the generated weights is performed using gradient boosting tree machine learning techniques.

7. The method of claim 1, wherein the second data for the set of completed transactions does not include items of post-transaction information for transactions in the set of completed transactions.

8. The method of claim 1, wherein the weighting indicates not to use one or more transactions in the set of completed transactions for training the second classifier module.

9. A non-transitory computer-readable medium having instructions stored thereon that are executable by a computing device to perform operations comprising:

training a first classifier module using first data for a set of completed transactions as training data input, wherein the first data includes, for respective transactions in the set of completed transactions both a set of pre-transaction information and a set of post-transaction information wherein correct classifications for transactions in the set of completed transactions are known, and wherein the set of post-transaction information for a first transaction in the set of completed transactions includes information for one or more transactions performed subsequent to the first transaction and non-transaction activity for a user associated with the first transaction;

generating respective weights for multiple transactions in the set of completed transactions based on classification outputs of the trained first classifier module for the multiple transactions;

training, based on the generated weights, a second classifier module using second data for the set of completed transactions as training data input, wherein the second data for the set of completed transactions includes pre-transaction information for transactions in the set of completed transactions; and classifying, using the trained second classifier module, one or more pending transactions based only on respective sets of pre-transaction information for the one or more pending transactions; and generating, based on classifications output by the trained second classifier module for the one or more pending transactions, an authorization decision for the one or more pending transactions.

10. The non-transitory computer-readable medium of claim 9, wherein the generating respective weights is performed using multiple different weighting techniques to generate multiple sets of weights;

wherein the training the second classifier module is performed on multiple versions of the second classifier module using the multiple sets of weights;

wherein the operations further comprise: selecting a trained version of the multiple versions of the second classifier module.

11. The non-transitory computer-readable medium of claim 9, wherein the generating the respective weights is based on relationships between correct classifications and output predictions generated by the trained first classifier module for the transactions.

12. The non-transitory computer-readable medium of claim 9, wherein the generating the respective weights provides greater weights for transactions whose output predictions are further from correct classifications.

13. The non-transitory computer-readable medium of claim 9, wherein the second data for the set of completed transactions does not include items of post-transaction information for transactions in the set of completed transactions.

14. A system, comprising:

at least one processor; and a memory having instructions stored thereon that are executable by the at least one processor to cause the system to:

train a first classifier module using first data for a set of completed transactions as training data input, wherein the first data includes, for respective transactions in the set of completed transactions both a set of pre-transaction information and a set of post-transaction information, wherein correct classifications for transactions in the set of completed transactions are known, and wherein the set of post-transaction information for a first transaction in the set of completed transactions includes information for one or more transactions performed subsequent to the first transaction and non-transaction activity occurring subsequent to the first transaction for a user associated with the first transaction;

generate respective weights for multiple transactions in the set of completed transactions based on classification outputs of the trained first classifier module for the multiple transactions;

train, based on the generated weights, a second classifier module using second data for the set of completed transactions as training data input, wherein the second data for the set of completed transactions includes pre-transaction information for transactions in the set of completed transactions;

classify, using the trained second classifier module, one or more pending transactions based only on respective sets of pre-transaction information for the one or more pending transactions; and generate, based on classifications output by the trained second classifier module for the one or more pending transactions, an authorization decision for the one or more pending transactions.

15. The system of claim 14, wherein the second data for the set of completed transactions includes pre-transaction information for transactions in the set of completed transactions and does not include items of post-transaction information for transactions in the set of completed transactions.

16. The system of claim 14, wherein the generating the respective weights is based on relationships between correct classifications and output predictions generated by the teacher first classifier module for the transactions.

17. The system of claim 14, wherein the weighting indicates not to use one or more transactions in the set of completed transactions for training the second classifier module.

18. The system of claim 14, wherein the generating the respective weights provides greater weights for transactions whose output predictions are further from correct classifications.

19. The system of claim 14, wherein the training the second classifier module based on the generated weights is performed using gradient boosting tree machine learning techniques.

20. The system of claim 14, wherein the generating respective weights is performed using multiple different weighting techniques to generate multiple sets of weights;
   wherein the training the second classifier module is performed on multiple versions of the second classifier module using the multiple sets of weights;
   wherein the instructions are further executable to cause the system to: select a trained version of the multiple versions of the second classifier module.

* * * * *